Jan. 11, 1955     B. L. HAVENS     2,699,545
AIRCRAFT BOMBING APPARATUS AND METHOD
Filed Aug. 1, 1945     2 Sheets-Sheet 1
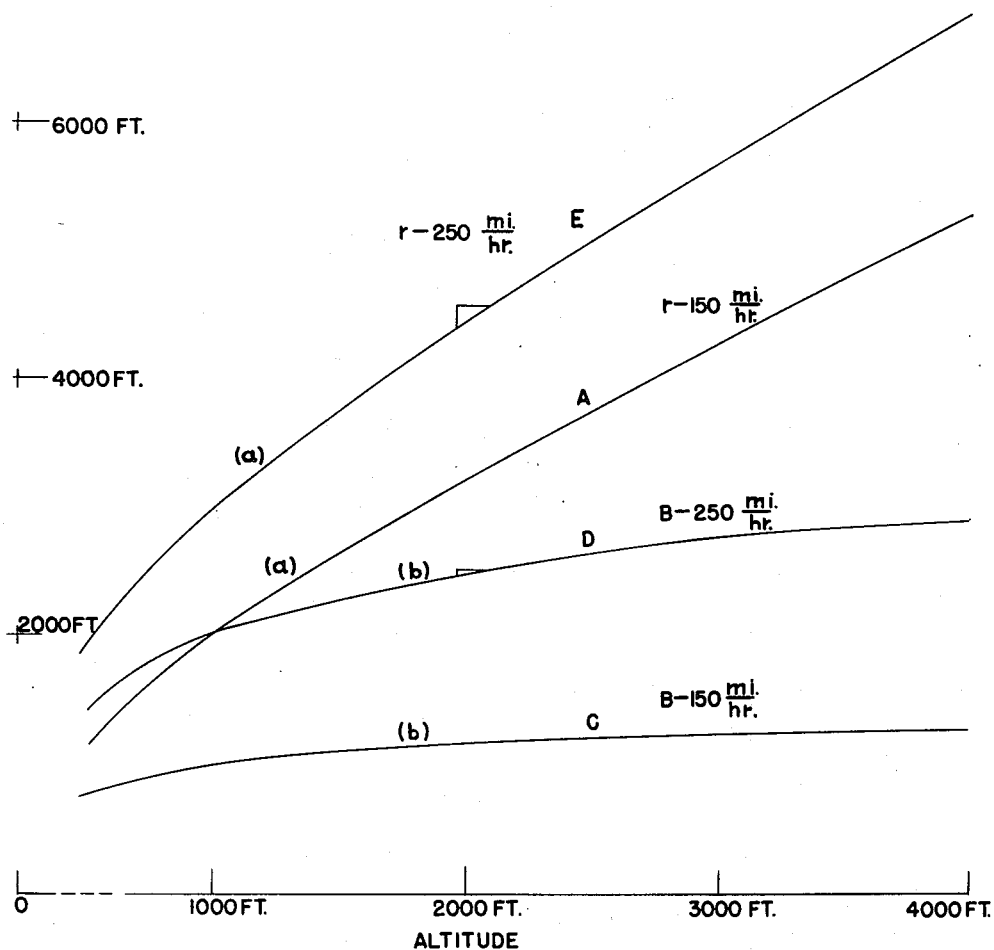
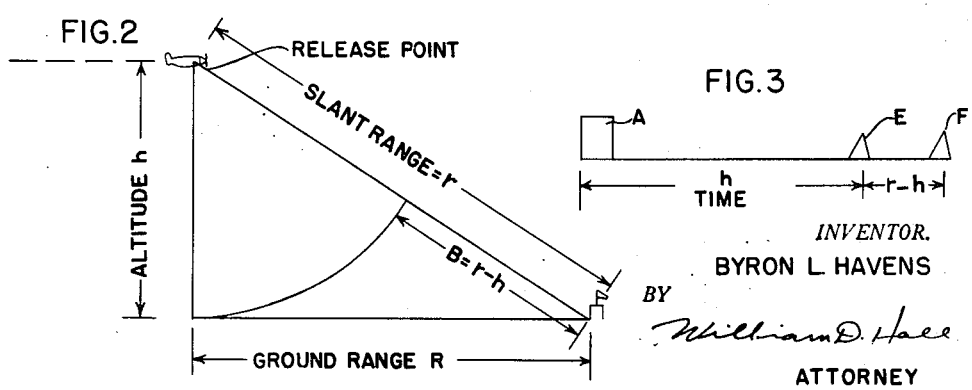
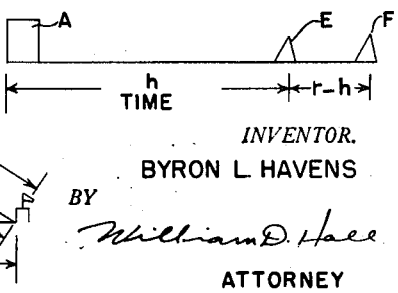
INVENTOR.
BYRON L. HAVENS
BY
William D. Hall
ATTORNEY Jan. 11, 1955   B. L. HAVENS   2,699,545
AIRCRAFT BOMBING APPARATUS AND METHOD
Filed Aug. 1, 1945   2 Sheets-Sheet 2
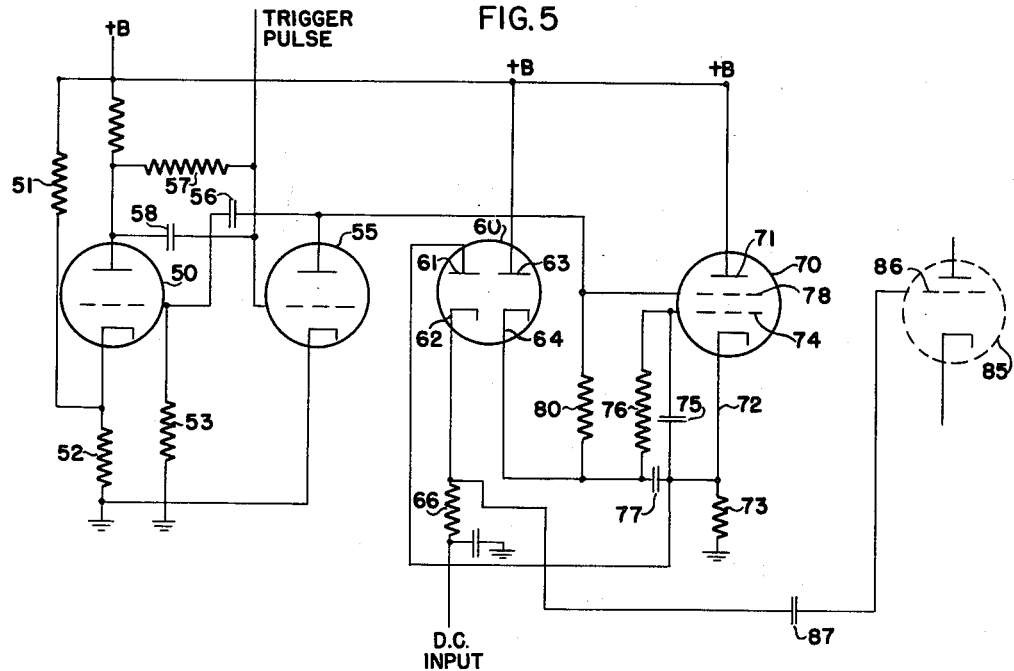
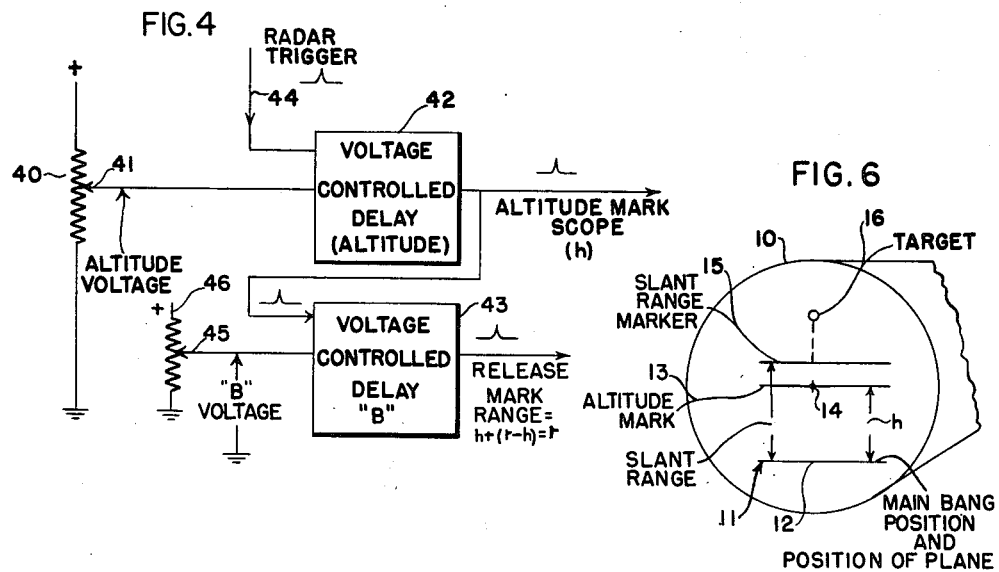
INVENTOR.
BYRON L. HAVENS
BY
ATTORNEY

United States Patent Office 2,699,545
Patented Jan. 11, 1955

2,699,545

AIRCRAFT BOMBING APPARATUS AND METHOD

Byron L. Havens, Cambridge, Mass., assignor, by mesne assignments, to the United States of America as represented by the Secretary of War Application August 1, 1945, Serial No. 608,317

9 Claims. (Cl. 343—13)

My invention relates in general to electronic apparatus and circuits and more particularly to such circuits for, and methods of, computing and indicating the proper slant range when used for instance in bombing operations.

When bombing a ground target from an aircraft in motion, the proper slant range from the target to the correct bomb release point is a function of ground speed of the plane, the altitude of the plane, the air speed of the plane, and the type of bomb used. Heretofore the slant range has been obtained from a table or a computer utilizing the known information such as the ground speed, air speed of the plane and the type of bomb and utilizing the altitude of the plane as determined in various manners. It will be appreciated therefore that errors in computing altitude accurately definitely affected the precision with which bombing operations were carried out. Accordingly, it is one of the objects of my invention to provide a method and apparatus for carrying out the method whereby the effect of such errors on the bombing precision will be minimized.

Since bombing usually takes place at a considerable altitude and, since, in using radio object locating apparatus in the determination of the position of the target to be bombed, it is necessary to radiate electromagnetic energy and to have a portion of the energy so radiated returned to the plane, the first signal which is returned to the plane should be from the object closest to the plane and this will be the ground immediately thereunder. Accordingly this returned signal is an indication of the altitude of the plane above ground and will be referred to hereinafter in the specification as the ground signal. It is accordingly another of the objects of my invention to utilize the action of the radiating apparatus to its fullest extent in providing accurate information for precision bombing.

The radiation of electromagnetic energy for the purpose of locating objects in the vicinity of the plane takes place in the form of short pulses. At the time of the radiation of one of these pulses of energy, there is an indication thereof that appears on the reproducing face of oscilloscope apparatus associated with the radiating apparatus. Such a pulse is termed a transmitted main pulse or is sometimes termed the "main bang" of the apparatus. It will be appreciated that energy reradiated from objects under the impetus of the action of the radiated energy also will be indicated on the oscilloscope and the position of such an indication with respect to the main transmitted pulse will also give an indication of the distance or range of the object with respect to the then position of the plane carrying the apparatus. Accordingly, if some mark or indicia can be registered on the reproducing face of the oscilloscope showing or representing the proper slant range from the plane to a desired target, it will be evident that coincidence of the position of the indication on the oscilloscope of energy reradiated from the proper target with the indicia or mark of the proper slant range will take place when the plane is at the proper bomb release position if the transmitted pulses are transmitted fairly often. This will be illustrated hereinafter in this specification. Accordingly, it is another of the objects of my invention to provide an arrangement whereby an indication of the proper slant range will be made on oscilloscope apparatus in the plane before and during the bombing run of the plane.

Heretofore, the method of providing an indication on the oscilloscope reproducing face of the proper slant range has in general consisted in the steps of determining the altitude of the plane and utilizing this value of altitude to obtain slant range from tables, charts or a computer, utilizing of course the known factors such as the speed of the plane and the type of bomb. The altitude then has been a major factor in determining the proper slant range and errors in computing the altitude have had a major effect on the accuracy of the bombing. On the other hand, the relationship of the proper slant range to altitude has been found to be of tremendous importance and accordingly, it is another of the objects of my invention to utilize the relationship between the proper slant range and the altitude to a major degree in a system for and method of accomplishing precision bombing.

In general my invention contemplates the use of electromagnetic generating and radiating instrumentalities and receiver means associated with these instrumentalities for the purpose of receiving energy reradiated from objects under the impetus of the radiated energy. According to my invention there is transmitted a main transmitted pulse or "main bang" the transmission time of which is shown at the time of its occurrence by the reproduction of the pulse on the reproducing face of a cathode ray tube associated with the receiver. Since the scanning in the cathode ray tube takes place in a definite fashion and in a definite time interval, it will be appreciated that energy reradiated or reflected from objects on which the radiated energy impinges will, when received by the receiving means and impressed onto the cathode ray tube associated therewith, indicate the instantaneous distance of objects with respect to the then position of the plane carrying the radiating apparatus. As has been stated hereinbefore in this specification, reflection or reradiation should take place most quickly from objects which are closest to the plane and since bombing is accomplished at fairly high altitudes, the first received reflected or reradiated signal should be from the ground under the plane. This then will be an indication of the altitude of the plane. If will be appreciated, however, that altitude can be measured in this fashion or a representation thereof could be shown by the use of a pressure sensitive bellows which controls the position of the moving arm on a potentiometer such for instance as is illustrated in the copending application of Luis Alvarez, Serial No. 542,287, filed June 27, 1944, now Patent No. 2,480,208, issued August 30, 1949, to develop a voltage proportional to the altitude which can be used as desired.

It has been found that the relationship between the proper slant range and the altitude of the plane is very important in bombing operations and hereinafter in this specification this relationship will be referred to by the relationship $$B = r - h$$

where $r$ is the proper slant rang and $h$ is the altitude of the plane above the ground at the proper release point for the bomb. It will be assumed that during the calculation of altitude referred to hereinbefore the plane will make an approach run maintaining substantially the same altitude and therefore the value of proper altitude may be obtained and utilized prior to the actual time of release of the bomb.

It has been found that for altitudes above two thousand feet the curve plotting the relative values of $r - h$ against $h$ is relatively flat. Accordingly, it will be appreciated that this will minimize the effect of errors in measuring the altitude of the plane during its approach run. A voltage proportional to the measured altitude is developed and is impressed onto what may be termed a voltage controlled delay circuit for the purpose of developing a control which will give an indication of the altitude of the plane on the reproducing face of the cathode ray tube of the receiver and this will be referred to hereinafter as the altitude mark on the scope. This should coincide with the position of the first received pulse indicated on the oscilloscope tube.

A portion of the voltage pulse developed by the voltage controlled delay circuit for developing the altitude mark on the scope is impressed onto a second voltage controlled delay circuit whose purpose it is to develop a signal for impression onto the receiver scope to indicate the proper slant range. This is done by combining at the input of the voltage controlled delay the pulse representative of the position of the altitude mark on the scope with the voltage representative of the value of "B." It will be apparent that the result of the two then will report the proper slant range as will be explained hereinafter in this specification.

There will be put out then from the second voltage controlled delay circuit a signal which occurs at an interval after the transmission of the main transmitted pulse or "main bang," and which, when impressed onto the cathode ray tube in the receiving means, will give an indication of the position of the proper slant range with respect to the main transmitted pulse. Since the target to be bombed also will give an indication on the cathode ray tube which will change in position as the plane moves, it will be obvious that the position of the proper target reproduced pulse will gradually approach the position of the proper slant range mark. When the two are coincident the plane has reached the proper bomb release point and the bombs may be released automatically in a manner heretofore known to the art or they may be released manually by the bombardier.

My invention will best be understood by reference to the drawings in which:

Fig. 1 is a set of explanatory curves;

Figs. 2 and 3 are explanatory diagrams;

Fig. 4 is a schematic diagram showing the developing of the signal for creating the altitude mark on the scope and also the proper slant range mark;

Fig. 5 is an exemplary voltage controlled delay circuit used to develop energy to provide markings on the face of the receiver scope; and Fig. 6 is a partial showing of a cathode ray tube used in practicing the methods of the invention.

Referring to Fig. 1, there is shown a set of explanatory curves. In this figure curves A and E represent the relationship between slant range and altitude at speeds of 150 miles per hour and 250 miles per hour for example. It will be seen that the slope of these curves is relatively large and accordingly errors in the derivation of the altitude of the plane make a considerable difference in the precision with which bombing is accomplished. For example, on curve E an error of one hundred feet in the measurement of altitude changes the slant range roughly in the neighborhood of 150 feet when accomplished at only a 2000 foot altitude.

On the other hand, curves C and D represent the value of B for speeds of 150 and 250 miles per hour respectively. Under similar circumstances to the example cited above an error of one hundred feet changes the value of B roughly only about 20 or 25 feet. It will be seen therefore that accuracy should be greatly enhanced since curves C and D are relatively flat compared to A and E and the effect of this relatively small difference between the proper voltage for $h$ and the voltage which is developed for a difference of one hundred feet will be comparatively negligible.

Referring to Fig. 2, there is shown an explanatory diagram illustrating the relationship between the various components used and included in the determination of the proper release point and of the proper slant range from the aircraft to the target at the proper release point of the bomb. The ground range R is the distance from the projection of a normal from the plane to the ground and the position of the target to be bombed. The altitude $h$ is the length of the normal from the position of the plane at the time of release of the bomb to the ground. The slant range $r$ is the distance from the bomb at the proper release point of the bomb to the target to be bombed. The factor $B$ equals $r-h$ and is illustrated by the arc from the ground at the point of intersection of the normal from the plane and intersecting the slant range line of the diagram using the release point as a center and the altitude $h$ as a radius.

Referring to Fig. 3, there is shown an illustrative diagram showing the relative position with respect to time of the main radiated pulse identified as A and the pulse returned from the ground immediately under the plane and identified as E and the pulse returned from the target and identified as F. This diagram is purely for purposes of illustrating a relationship and no attempt has been made to observe any proper scale. It has been found that the proper utilization of the relationship $r-h$ is of paramount importance.

Referring to Fig. 4, there is shown illustratively an arrangement for developing the necessary voltage or current for properly positioning the altitude mark $h$ on the reproducing face of the oscilloscope tube used in conjunction with the electromagnetic energy radiating and receiving equipment carried by the plane.

In the arrangement in accordance with Fig. 4, there is provided a potentiometer 40 having a source of energy (indicated) impressed thereon and a sliding arm 41. The arm 41 is connected to the input of a voltage controlled delay circuit 42 whose function is to develop energy at a correct time in order to cause to be reproduced on the face of a cathode ray tube a mark indicative of the altitude of the plane carrying the device. The circuit will be explained more fully hereinafter with respect to Fig. 5. An input from the trigger generator of the radio object locating device also is connected to the delay device. The output of the voltage controlled delay 42 is indicated as the altitude mark and the signal developed is coupled through appropriate means to the cathode ray tube of the receiver hereinbefore referred to for the purpose of producing the desired mark. The output of 42 also is connected to the input of a second voltage controlled delay circuit 43 whose function is to develop a signal which, when impressed onto the cathode ray tube of the receiver, will indicate the proper slant range with respect to the "main bang" or initial pulse or trigger pulse of the radio object locating device. These relative positions will be indicated hereinafter with respect to Fig. 6. Also connected to the input of controlled delay circuit 43 is the sliding tap 45 of a potentiometer 46. The setting of the potentiometer indicates the proper value of "B" voltage which may be derived in terms of the height of the plane and the other known factors affecting the bombing. The output of the voltage controlled delay circuit 43 is shown schematically and may be coupled to the cathode ray tube of the receiver by means of appropriate and well known coupling means. Hence there will be indicated on the tube a mark showing the proper slant range from the point of release of the bomb to the target.

In the instance of both voltage controlled delay circuits 42 and 43, coupling between the output energy of the circuit and the cathode ray tube may be made in well known fashion and since such coupling means are not the essence of this invention and these means may be well known forms of coupling means to transfer the energy from the circuits to the modulating means of the cathode ray tube on which the energy is impressed, the means are not shown in this figure of the drawing.

Referring to Fig. 5, there is shown a circuit for developing a pulse to be applied to the control electrode of the scope in order to provide a marker line indicative of the correct altitude of the plane and a similar circuit is used to provide a pulse which will reproduce on the scope a line indicative of the correct slant range with respect to the point of origin or line of origin of scan of the scope. The triode 50 has the plate thereof connected to $+B$ and back through a resistor 51 to the cathode thereof. The cathode is grounded through a resistor 52. The control electrode is grounded through a resistor 53.

A second triode 55 is provided having the cathode thereof grounded and the anode thereof connected through condenser 56 to the grid of triode 50. The grid of triode 55 is connected through a parallel combination of a resistor 57 and condenser 58 to the plate of triode 50. The grid of triode 55 also is coupled suitably so as to have supplied thereto a trigger pulse such as the trigger pulse normally developed for use in radio object locating devices. The trigger pulse occurs at the beginning of a scan of the device and hence material reproduced on the cathode ray tube associated with the receiving apparatus of the device presents intelligence with respect to the beginning of the scan or the trigger pulse which initiates the scan.

There is further provided a double diode arrangement 60 having plate 61 and cathode 62 and plate 63 and cathode 64. Cathode 62 is connected through resistor 66 to a D.-C. input. This D.-C. input is the control voltage which has been previously referred to hereinbefore in this specification and which represents either the proper value of altitude for the plane carrying the device or the proper slant range from the point of release of the bomb to a target, this depending on which of the markers is to be developed by the circuit.

A multigrid vacuum tube 70 is provided having its plate 71 connected directly to the source of positive potential (+B) and its cathode 72 grounded through resistor 73, this tube acting as a cathode follower arrangement. Grid 74 is connected to the cathode through condenser 75 and also through resistor 76 and condenser 77, the latter two elements being serially connected. The plate 61 of the double diode 60 is connected to the cathode 72 of tube 70. Grid 78 of the tube 70 is connected through resistor 80 to the cathode 64 of the double diode and also is connected directly to the plate of triode 55. A multigrid tube 85 is provided having one grid 86 thereof connected through condenser 87 to the cathode 62 of the double diode.

The sudden conduction of the diode comprised by plate 61 and cathode 62 will cause a pulse in the output of tube 85. This pulse may then be utilized for impression onto the control electrode of the cathode ray tube comprising the receiver scope and thus will form the desired marker line on the face of the tube.

Since the bombing approach of a plane may not be made at all times at the same altitude, it is necessary that an arrangement be provided so that a desired altitude mark may be set on the face of the reproducing scope of the receiver of the radio object locating device in order that proper bombing runs may be made. Since the proper slant range will vary with altitude of a plane, some flexible arrangement must be provided so that the proper slant range mark may be indicated on the face of the aforementioned scope. It is the purpose of the apparatus shown in Fig. 5 to accomplish this purpose. The action of the apparatus is as follows:

Taking for example that the altitude of the plane has been utilized to develop a voltage indicative of its height above the ground as indicated in Fig. 4, the device will operate in the following manner. Triode 50 normally is non-conducting and triode 55 normally is conducting. Plate current flow from the diode comprised by elements 63 and 64 and by tube 55 will be through resistor 80 and through tube 55 to ground. There should then be substantially no effect on condenser 56. However, when a trigger pulse is received, tube 55 is blocked and current flow from the diode comprised by elements 63 and 64 will be through resistor 80 and to condenser 56 and to ground by way of resistor 53 hence the condenser 56 will begin to charge. When the tube 55 is blocked tube 50 will start conducting current and since it is coupled to the grid of tube 55 it will tend to hold tube 55 blocked for a predeterminable period of time depending upon the parameters of the circuit. As this occurs the voltage on the grid 78 of tube 70 will be in the nature of a sawtooth shaped varying voltage and accordingly the potential at the common terminal between cathode 72 and resistor 73 will vary in a similar manner since tube 70 is arranged as a cathode follower arrangement. The steady D.-C. voltage which has been developed as representative of the altitude of the plane above ground is impressed as a positive potential onto the cathode of the diode comprised by elements 61 and 62 and accordingly at the time of receipt of the trigger pulse there will be no flow through this diode because of lack of the necessary difference of potential between the plate 61 and the cathode 62 thereof. On the other hand, however, the potential of plate 61 will vary in accordance with the potential of the common terminal of cathode 72 and resistor 73 and will gradually rise to such a value that the diode will begin to conduct. The time as which it begins to conduct after the arrival of the trigger pulse and the impression of the pulse onto tube 55 will depend upon the value of the D.-C. potential impressed onto the cathode 62 and which is a measure of the altitude of the plane. When the diode begins to conduct there will be a pulse applied to the grid 86 of tube 85 through the connection from cathode 62 through condenser 87 to the grid of tube 85.

Tube 85 in actual practice has been one of the tubes in a multivibrator which can be pulsed into operation by a control signal such as the one developed by the diode comprising elements 61 and 62. The multivibrator then will produce a pulse which may be impressed onto the modulating electrode of the receiver scope through appropriate and well known coupling means. Since multivibrators per se and since methods of producing short pulses from them are well known and since such coupling means are well known, these are not illustrated in this figure, the figure merely illustrating the actual operation of the voltage controlled delay portion of the circuit.

It will be seen, therefore, that this circuit comprises a voltage sensitive delay circuit whose operation depends upon the value of the D.-C. input which may be representative either of the altitude of the plane or the correct slant range depending upon which mark it is desired to develop by the circuit. There will appear, therefore, a mark on the reproducing face of the receiver scope which will bear a position relative to the initial or trigger pulse which is dependent on the value of the D.-C. voltage developed to represent either the altitude or the correct slant range. For purposes of ease and further accuracy, the potentiometer arm 41 of Fig. 4 may be set to a position so that the altitude mark on the receiver scope corresponds exactly in position with the first reproduced reflected pulse on the scope which, as has been indicated hereinbefore in this specification, will represent the altitude of the plane above ground.

Referring to Fig. 6, there is shown a representation on the face of a reproducing scope 10 of a manner in which the information derived as stated hereinbefore can be utilized for bombing. The type of scan which has been represented is one where the origin of the scan is at the point 11 and the line sweep is made from left to right and the frame of the scan is progressively from bottom to top of the scope. Therefore, the position of the representation of the initial pulse transmitted by the transmitting apparatus or as it has been termed the "main bang," and which represents the position of the plane carrying the apparatus will be along the line 12 and has been identified in the drawing. The output of the voltage sensitive delay circuit 42 and which is impressed onto the scope to form the altitude mark 13 is indicated in the drawing and identified as the altitude mark thereon. The first reflection which is indicative of the altitude is indicated at 14 and the slide arm 41 of potentiometer 40 of Fig. 4 will be adjusted until the mark 14 is coincident with line 13. The output of the voltage controlled delay circuit 43 which is used to derive a signal which is indicative of the correct slant range will cause on the face of the scope a mark which has been identified thereon as the slant range marker 15. The reflection from the target to be bombed is indicated as 16 and it will be appreciated that the position of the target mark will change as the plane approaches the target and it will be assumed that the plane is flying in a straight line. The target mark then will move downwardly along the dotted line indicated in this figure. It is obvious then that when the target mark becomes coincident with the slant range mark 15 the plane is then at the correct point for the bombs to be released. This may be accomplished manually by the bombardier or it may be accomplished automatically. The automatic release per se does not form a part of this invention and accordingly it is not described.

Since the artificial altitude mark on the scope is adjusted so as to coincide with the first returned signal, which is the ground signal, and further since the voltage controlled delay circuit which is used to develop the proper slant range mark on the scope is dependent for its action in the voltage controlled delay circuit developing the altitude mark, it will be appreciated that this will further enhance the accuracy of the device since the factor B has been used to its fullest extent. As has been pointed out hereinbefore the curve plotted B against $h$ is reasonably flat and this fact is taken advantage of in the method as pointed out hereinbefore.

The example given hereinbefore in the case of the difference in effect in using the curves plotting the proper slant range against altiude as against those plotting the B factor against altitude has been a rough approximation only.

It will be appreciated that there may be departures from the particular showing of the invention which will fall within the spirit of the invention, therefore, I claim all such deviations which fall fairly within the spirit and scope of the invention as defined in the hereinafter appended claims.

What I claim is:

1. A method of releasing bombs from an aircraft wherein there is to be ascertained the correct slant range between aircraft and a ground target at which a bomb should be released, wherein electromagnetic energy is transmitted from the aircraft and reflected from the target, and wherein a visual representation of both the transmitted and reflected energy is provided, the method which comprises the steps of providing a visual indication of the altitude of the aircraft above the ground, providing a visual indication of the correct slant range, and providing a visual indication of the instantaneous slant range from aircraft to target whereby a visual comparison may be made of the correct slant range and instantaneous slant range, said visual altitude indication providing a means of checking the accuracy of the correct slant range indication.

2. A method of releasing bombs from an aircraft wherein there is to be ascertained the correct slant range between aircraft and a ground target at which a bomb should be released, wherein electromagnetic energy is transmitted from the aircraft and reflected from the target, and wherein a visual representation of both the transmitted and reflected energy is provided, the method which comprises the steps of ascertaining the altitude of the aircraft from the ground, obtaining a signal corresponding to said altitude, utilizing said signal to provide a visual representation of said altitude, deriving from said signal an additional signal representative of the correct slant range, producing from said additional signal a visual representation of said correct slant range, and providing a visual representation of the instantaneous slant range from aircraft to target whereby a visual comparison may be made of the correct slant range and instantaneous slant range, said visual altitude indication being used for checking the accuracy of the correct slant range indication.

3. In aircraft bombing apparatus of the character disclosed, cathode ray oscilloscope apparatus having a fluorescent screen, means for obtaining a signal corresponding to the altitude of the aircraft, means including said oscilloscope apparatus for utilizing said altitude signal to provide an indication on said screen of said altitude, said screen also having an indication thereon of the instantaneous slant range of the target to be bombed, electronic means for utilizing said altitude signal to obtain an additional signal corresponding to the value of the calculated correct slant range for bomb release, and means including said oscilloscope apparatus for applying said additional signal to said screen to provide thereon an indication of the correct slant range of the target for bomb release.

4. In aircraft bombing apparatus of the character disclosed, cathode ray oscilloscope apparatus having a fluorescent screen, means for obtaining a signal corresponding to the altitude of the aircraft, means including said oscilloscope apparatus for utiliizng said altitude signal to provide an indication on said screen of said altitude, said screen also having an indication thereon of the instanteous slant range of the target to be bombed, means for obtaining a B signal corresponding to the quantity B where $B=r-h$, where $h$ is the altitude of the aircraft, and $r$ is the calculated correct slant range for bomb release, means having said B signal and altitude signal applied thereto and constructed and arranged for computing a signal corresponding in value to $r$, and means including said oscilloscope apparatus for applying said $r$ signal to said screen to provide thereon an indication of the correct slant range of the target for bomb release.

5. In aircraft bombing apparatus of the character disclosed, cathode ray oscilloscope apparatus having a fluorescent screen, manually adjustable means for obtaining a signal corresponding to the altitude of the aircraft, means including said oscilloscope apparatus for utilizing said altitude signal to provide an indication on said screen of said altitude, said screen also having an indication thereon of the instantaneous slant range of the target to be bombed, manually adjustable means for obtaining a B signal corresponding to the quantity B where $B=r-h$, where $h$ is the altitude of the aircraft, and $r$ is the calculated correct slant range for bomb release, means having said B signal and altitude signal applied thereto and constructed and arranged for computing a signal corresponding in value to $r$, and means including said oscilloscope apparatus for applying said $r$ signal to said screen to provide thereon an indication of the correct slant range of the target for bomb release.

6. In aircraft bombing apparatus of the character disclosed for use in conjunction with radar apparatus having a trigger, cathode ray oscilloscope apparatus having a fluorescent screen, manually adjustable means for obtaining a signal corresponding to the altitude of the aircraft, means having said altitude signal and a radar trigger applied thereto for providing an altitude marker, means including said oscilloscope apparatus for utilizing said altitude marker to provide an indication on said screen of said altitude, said screen also having an indication thereon of the instantaneous slant range of the target to be bombed, manually adjustable means for obtaining a B signal corresponding to the quantity B where $B=r-h$, where $h$ is the altitude of the aircraft, and $r$ is the calculated correct slant range for bomb release, means having said B signal and altitude mark applied thereto and constructed and arranged for computing a signal corresponding in value to $r$, and means including said oscilloscope apparatus for applying said $r$ signal to said screen to provide thereon an indication of the correct slant range of the target for bomb release.

7. In aircraft bombing apparatus of the character disclosed for utilizing radar and a cathode ray oscilloscope for indicating altitude and range, said oscilloscope having a periodically varying sweep for moving the beam thereof in one plane and a linear sweep controlled by a radar trigger for moving the beam thereof in a second plane substantially perpendicular to said first plane, said beam having intensifier means associated therewith, in combination, manually adjustable means for obtaining an altitude voltage corresponding to the altitude of the aircraft, first delay means having said altitude voltage and radar trigger applied thereto for obtaining an altitude mark for application to said intensifier means for providing a line on said screen corresponding to the altitude of the aircraft, manually adjustable means for obtaining a B voltage computed according to the formula $B=r-h$, where $r$ is the correct release slant range for bombing purposes, and $h$ is the altitude of the plane above the ground at the proper release point for the bomb, and second delay means having said B voltage and altitude mark applied thereto for providing a release range mark for application to said intensifier means for providing a line on said screen corresponding to correct release slant range, said intensifier means having the radar pulse applied thereto to provide a line on said screen indicating the instant position of the aircraft, said intensifier means also having the radar target echo applied thereto to provide an indication on said screen of the instant slant range to the target.

8. A method of releasing bodies from an aircraft to cause them to fall within a predetermined target area on the ground comprising the steps of determining the altitude of the aircraft, utilizing the altitude as a factor in computing the proper release slant range for releasing the bodies, positioning a correct slant range release marker on a cathode ray oscilloscope, obtaining a signal of the predetermined target area on said oscilloscope, and releasing said bodies when the target area signal and the correct slant range release marker bear such a relationship with respect to each other so as to indicate the proper release time.

9. In aircraft bombing apparatus, oscilloscope apparatus including a cathode ray tube having a screen, means for obtaining a signal corresponding to the altitude of the aircraft, electronic means utilizing said altitude signal to obtain an additional signal corresponding to the value of the calculated correct slant range for bomb release, and means including said oscilloscope apparatus for applying said additional signal to said screen to provide thereon an indication of the correct slant range of the target for bomb release.

References Cited in the file of this patent

UNITED STATES PATENTS

| Number | Name | Date |
| --- | --- | --- |
| 1,356,285 | Hopper | Oct. 19, 1920 |
| 2,405,238 | Seeley | Aug. 6, 1946 |
| 2,409,448 | Rost et al. | Oct. 15, 1946 |
| 2,409,462 | Zworykin et al. | Oct. 15, 1946 |
| 2,430,292 | Hershberger | Nov. 4, 1947 |